Figure 1:
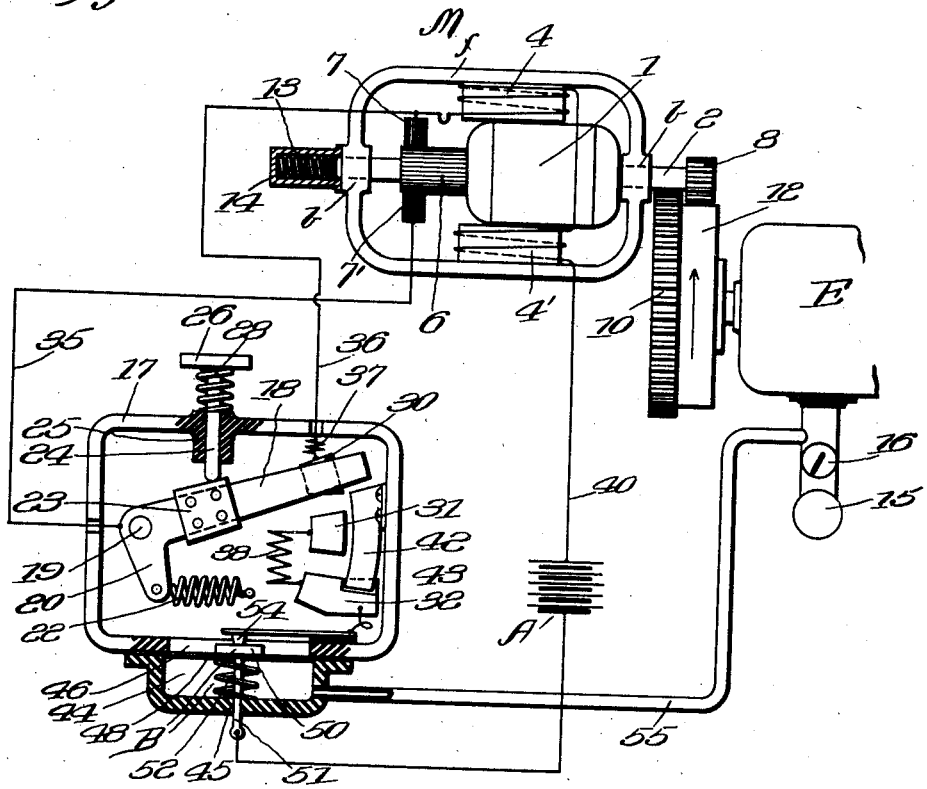

S. W. RUSHMORE.
ELECTRICAL ENGINE STARTER.
APPLICATION FILED NOV. 13, 1912.

1,079,725.

Patented Nov. 25, 1913.

Witnesses:
J. W. Millward
M. L. Breslin

Inventor
Samuel W. Rushmore
By his Attorney
Alfred Wilkinson

UNITED STATES PATENT OFFICE.

SAMUEL W. RUSHMORE, OF PLAINFIELD, NEW JERSEY.

ELECTRICAL ENGINE-STARTER.

1,079,725.  Specification of Letters Patent.  Patented Nov. 25, 1913.

Application filed November 13, 1912. Serial No. 731,094.

*To all whom it may concern:*

Be it known that I, SAMUEL W. RUSHMORE, a citizen of the United States, residing at Plainfield, in the county of Union and State of New Jersey, have invented new and useful Improvements in Electrical Engine-Starters, of which the following is a specification.

This invention relates to means for starting internal combustion engines by means of a supplemental source of power preferably an electric motor, and it includes the motor, a shiftable member such as a gear adapted to apply the power of the supplemental motor to rotate the internal combustion engine, together with provision for automatically throwing out the driving connection when the engine has started.

One object of my present invention is to employ a positive driver and means for shifting it into and out of driving relation at the proper times, organized and controlled so that acceleration of rotation of the motor up to the desired speed will be retarded until the positive coupling has been effected. In its present embodiment these objects are presented in connection with a broader invention described and claimed in my prior application Serial No. 722,629, filed September 27, 1912. In said prior application I employ a shiftable driving member such as a gear, and cause it to be shifted into and out of engagement at the proper time through the medium of an electromagnetic field energized from an auxiliary source of power such as a storage battery acting against mechanical opposition such as may be afforded by a coil spring. The strength of the field is controlled by and in accordance with an increasing generator effect due to increase of speed which results upon starting of the internal combustion engine. The generator effect thus utilized is preferably the counter electromotive force in the motor winding of the armature. The resilient gear shifting effort of the spring or equivalent device is proportioned or predetermined with reference to the varying strengths of the field, or rather its varying strengths of the field, so that the driver is gear shifting efforts, so that the driver is automatically thrown out when the engine starts. In said prior application as in my present application the shifting magnet is in series with the armature current, so that its energy is directly controlled by the counter electromotive force or generator effect of the latter, and two features of my primary invention consists in utilizing the shifting magnet as the field of the starting motor, and connecting it in series with the armature. As applied to such a structure my present invention may be realized by arranging means initially under-energizing the armature by any desired means permitting full energization of the shifting magnet somewhat in advance of the full energization of the armature. Where the shifting magnet is the motor field of a series wound motor, this may be conveniently accomplished by means of a controlling device adapted to first close the circuit with a shunt across the armature so that the latter will receive much less than the normal current and thereby be slowly rotated while the field magnet will receive the much greater current necessary for effecting the shifting operation. In actual practice the resistance of the field is so low that a series resistance is desirable to prevent the field acting as a short circuit on the battery. In this situation the positive driving coupling is shifted while slowly rotating so as to enable the positive engaging members to come silently and easily into registering position with the minimum jar or shock. The controller is also arranged to open the shunt across the armature and cut out the series resistance thereby permitting maximum current to flow in series through armature and field coils. Engagement having been thus effected, and the full torque of the motor being applied to the engine, the latter is driven up to starting speed, when increasing speed and relief of the load through starting, causes a jump in the counter electromotive force of the motor thereby cutting down the current, thus rendering the shifting magnet too weak to longer overbalance the resilience of the shifting spring which then operates to disconnect the driver. The latter continues to rotate until the supply circuit is broken by means of the controller.

An important feature of my primary invention which I may utilize herein is the mounting of the shifting gear directly on the armature shaft and arranging the latter for endwise shift in response to the resultant efforts of the varying field and the resilient spring.

These and other features of my invention are shown in the accompanying drawing which shows a preferred and desirable embodiment of my invention and in which the parts are designated by similar characters in both of the figures of the drawing.

Figure 2:
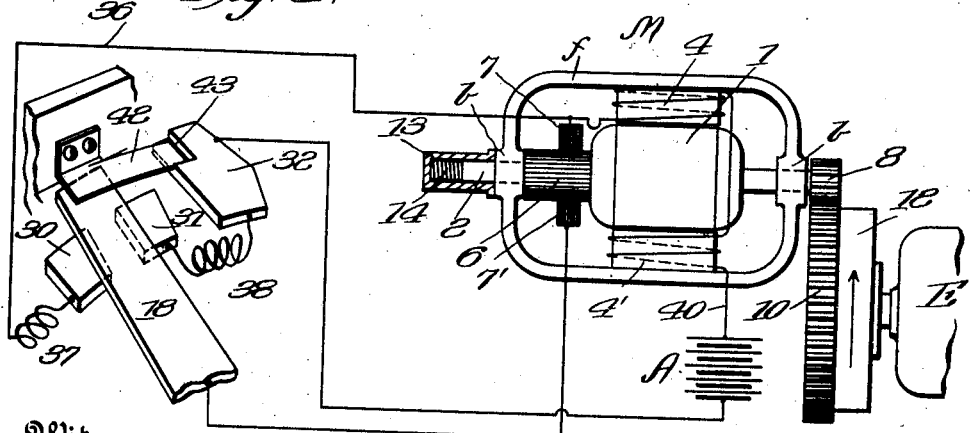

Figure 1 shows somewhat diagrammatically the features of my invention in their normal disengaged position when the motor is inactive and Fig. 2 shows the motor in position of engagement when energized and illustrates in partial perspective a particular mechanical feature of the controlling switch.

In the figures M indicates the starting motor consisting of an armature 1 carried on a shaft 2 and having the field poles 4—4', commutator 6, and the commutator brushes 7—7'. A suitable frame f is indicated to support the pole-pieces 4—4' and to provide bearings b—b for the armature-shaft 2 which as shown is elongated and provided on one end with a driving pinion 8. This pinion 8 is adapted to engage gear teeth 10 cut in the rim of the engine fly wheel 12.

The engine is indicated at E and is the usual internal combustion motor of the automobile type and has the carbureter 15 and throttle valve 16.

As shown the armature is supported by the shaft 2 normally to be displaced longitudinally with reference to the field poles under the action of a coiled spring 14 arranged between the end of the shaft 2 and the end of a bearing bracket 13 attached to the supporting bracket f. The normal displaced position of the parts is shown in Fig. 1 where it will be seen that the spring 14 has forced the armature endwise out of the field a sufficient distance to throw the pinion 8 out of engagement with the flywheel gear 10.

Upon energizing the motor the effect is powerfully to magnetize the field poles to exert a powerful horizontal attraction or pull on the armature to move it into alinement with the field poles, against the influence of the return spring 14. While in the displaced position shown in Fig. 1 the field will not exert its maximum rotative effect upon the armature which thus will at first be moved rapidly in a horizontal direction but with less than maximum rotative effort owing to the then reduced area of the effective magnetic field. The movement of the armature into its field will carry with it the pinion 8 into driving engagement with the gear 10, as shown in Fig. 2, thereafter the armature and fields being in alinement, the full rotative effort is produced to start the engine.

When the motor is driving the engine a heavy current flows through the field coils so that the magnet is powerfully excited. Upon the occurrence of the first explosion in the engine cylinders, however, the flywheel and armature are rapidly accelerated. This increases the counter electromotive force in the armature and thereby reduces the current flow through the armature and field to such a value that the axial magnetic pull on the armature is no longer able to overcome the force of the end spring 14. The spring 14 therefore acts to shift the armature and disengages the gears and thus the motor will continue to spin at high speed in the disengaged position until the switch is opened.

In order to insure that with gears of ordinary construction and having blunt ends the engagement shall always be effected without shock or jar I have found it desirable to make special provision for reducing the rotative effort of the armature at the moment of engagement and to apply the maximum rotative effort only after the gears have come into engagement. This I have accomplished by the particular device now to be described.

In Fig. 1, 17 is a switch or controller box consisting preferably of insulating material, within which is a switch arm 18 fulcrumed at 19 and formed with an arm 20 to which is attached a tension spring 22 normally holding the arm in the position shown. 23 is an insulating block on the arm 18 adapted to be engaged by the push rod 24 in a bearing 25 in the box and provided at its upper end with a foot button 26 and normally held in elevated position as shown by a coiled spring 28. 30, 31 and 32 are stationary contacts arranged to make contact successively with the switch arm 18 when pressure is applied to the foot button 26. The contact arm 18 is shown electrically connected to the commutator brush 7' by connection 35 and the contact 30 is connected by a conductor 36 with the commutator brush 7, through the resistance 37. 38 indicates a resistance interposed between the contacts 31 and 32, the latter contact being connected through a circuit breaker B, (to be described) to the battery A from which the circuit is completed through connection 40 to the motor field coil 4'.

Pressure being applied to the foot button 26 the arm 18 will first engage contact 31 while still retaining contact with contact 30 as best shown in Fig. 2 thus closing the circuit so that a current will flow from the battery A to contact 32, through resistance 38 to contact 31 there dividing, part going through the switch arm 18 and connection 35 to brush 7', through the armature to brush 7, where it is joined by the balance of the current which passes through the resistance 37 and connection 36, the re-united current then passing through the field coils 4—4', and connection 40 to the battery. In practice the connection 36 if not of large cross section may serve the purpose of the resistance 37 which may in some cases be omitted.

With the switch arm in this position it will be seen that part of the current has been shunted around the armature so that it will exert less than its maximum torque, while the entire current passes through the field coils so that the maximum end pull is exerted upon the armature to bring the gears into engagement. Upon further movement of the arm 18 engagement with contact 30 is interrupted and the entire current will then pass through the armature and field coils, and through the resistance 38 which limits the total current to that required to cause the gears to slide into mesh without shock or jar. Upon depressing the switch arm 18 to the end of its movement it will make contact with contact 32 thus cutting out the resistance 38 so that the maximum current will flow through the motor and the latter will exert its maximum effort to start the engine.

As explained above the motor automatically disengages from the engine after the latter has started to run under its own power and has exceeded a predetermined speed, and will continue to rotate at high speed in its disengaged position as long as the switch arm 18 remains in contact with contact 32.

In order that upon the return movement of the switch arm 18 it may not make contact with the contacts 31 and 30, which would result in the flowing of a sufficient current through the field coils to cause the armature to draw its pinion into collision with the rapidly moving teeth of the flywheel gear I provide an inclined bridge spring or clip 42 which will yield to allow the end of the arm 18 to pass thereunder upon the downward movement to start the motor, but upon which the arm end will ride upon the return movement under the action of spring 22 and thus pass freely over contact 31 without making contact therewith. The switch arm for this purpose is made sufficiently resilient, and the clip 42 as best shown in Fig. 2 is arranged with its end resting in a notch 43 formed in the contact piece 32 thus at its free end normally to be below the switch arm whereby the arm will ride thereover on its return stroke and at its secured end is elevated sufficiently to permit the arm to pass thereunder.

To provide against injury to the motor or gears through the wilful or accidental operation of the above described starting switch I may provide means for automatically interrupting the circuit when the engine is operating under its own power. This specific means forms no portion of my present invention and will be made the subject-matter of a divisional application. This may be operated by centrifugally actuated means, but I prefer to employ the device shown, consisting of the vacuum chamber 44 formed by a cup element 45 attached to the controller box 17 to cover an aperture 46 in the box which is closed by a diaphragm 48. The diaphragm carries a contact 50 with a stem 51 surrounded by a spring 52 adapted to press the contact into engagement with contact point 54 through which the main circuit is closed from the battery.

The vacuum chamber 44 communicates with intake of the engine through the tube 55.

The spring 52 is so adjusted that the suction due to the aspirating effect of the engine when the latter is being driven by the motor will not be sufficient to separate the contacts 50 and 54, but will yield and permit the separating of the contacts when, due to the rise in speed of the engine when running under its own power, the suction is increased.

It will thus be seen that I have avoided the use of all gear shifting mechanism and that by the simple closing of the switch the armature pinion is automatically thrown into engagement with the gear on the engine fly wheel in the desirable manner described and after coming into full engagement the maximum armature effort will be imparted to the wheel to cause it to revolve.

By employing the counter-electromotive force of the speeding motor as an important factor for the disengagement of the motor it will be seen that I have avoided the use of complicated mechanical devices for that purpose. It will readily be understood that this feature of my invention may be incorporated with the armature and fields forming the operating magnet, as shown, or a separate magnet may be provided having its field in series with the motor. In either event the operating magnet will be influenced by the described characteristic property of a series field to cause disengagement of the motor as a result of the decreased power of the magnet.

The particular arrangement described is desirable for the reasons given but it will be understood that my device is subject to various modifications without departing from the spirit of the invention.

Having described my invention, I claim,—

1. The combination with an engine, a starting motor and means for engaging same with the engine, of means for passing a comparatively large current through the field windings and less than maximum current through the armature until the engagement has been effected and thereafter passing the full working current through the armature.

2. The combination with an engine and a starting motor having the field and armature connected in series, of means for engaging the motor with the engine, a shunt adapted to divert a portion of the current from passing through the armature so that at the moment of effecting engagement the latter will exert less than its maximum torque and means for disconnecting said shunt to cause the motor to exert its maximum torque for starting the engine.

3. The combination with an engine, a starting motor having a series winding on its field, of means for connecting the motor to the engine, said means being actuated by the main load current passing through the motor and means for causing less than maximum current to pass through the motor armature, so that the armature will exert less than its maximum torque until the motor has been brought into engagement with the engine.

4. The combination with an engine, and a starting motor, of means for first passing the comparatively strong current through the field magnet winding and less than maximum current through the armature and thereafter passing the full working current through the armature and driving connections between said motor and said engine, said driving connections being automatically brought into operative engagement when less than the maximum current is flowing in the armature.

5. The combination with an engine, and a starting motor having a series winding upon the field, of means for connecting the motor to the engine, said means being actuated by the main load current passing through the motor, and means for causing less than maximum current to pass through the motor armature, so that the armature will exert less than its maximum torque until the motor has been brought into engagement with the engine.

6. An engine, a starting electric motor, provided with means for engaging or disengaging the motor and the engine, in combination with means for passing a comparatively large current through the field winding and a comparatively small current through the armature until engagement has been effected, and thereafter passing the full working current through the armature, and so arranged as to cause the automatic disengagement of the motor from the engine after the engine has reached a predetermined speed.

7. An engine, a starting electric motor provided with means for engaging or disengaging the motor and engine, in combination with means for first powerfully exciting the field magnet and passing a comparatively small current through its armature until engagement of the motor and engine has been effected, and thereafter passing the full working current through the armature and so arranged that the motor will automatically become disengaged from the engine after the engine has reached a predetermined speed.

8. The combination with an engine, a starting electric motor provided with a series field winding, of means for connecting the motor to the engine, such means being actuated by the motor current, means to cause less than the maximum current to pass through the motor armature, so that the armature will exert less than its maximum torque, until the motor has been brought into engagement with the engine, and means whereby the reduction in current passing through the motor after the engine has reached a predetermined speed will cause the disengagement of the motor from the engine.

9. The combination with an engine and a starting electric motor provided with a series field winding, of means for connecting the motor to the engine, such means being actuated by the motor current, and of means for causing less than the maximum current to pass through the motor armature, so that the armature will exert less than its maximum torque until the motor has been brought into engagement with the engine, and means whereby the increased counter electromotive-force of the motor will cause the disengagement of the motor from the engine after the engine has reached a predetermined speed.

10. The combination with an engine, a series-wound starting motor, normally disengaged driving connections, a storage battery adapted to energize said motor, and a controlling device adapted to close the circuit from the battery to the motor with the armature receiving less than the maximum current to effect the engagement of said driving connections, and to thereafter deliver to the armature a maximum current.

11. In combination, an internal combustion engine, a rotary motor armature, a driving connection therebetween, means including an electromagnet coil adapted to shift said driving connection into driving relation with the engine, means for connecting said electromagnet coil for energization independently of current flow in the armature and for connecting it for energization varying in accordance with the current flow through the armature to thereby effect coupling of the motor and engine and the starting of the latter.

12. In combination, an internal combustion engine, a rotary motor armature, a driving connection therebetween, means including an electromagnet coil and an opposing spring adapted to shift said driving connection into and out of driving relation with the engine, means for connecting said electromagnet coil for energization independently of current flow in the armature and for connecting it in series with the armature to thereby effect coupling and uncoupling of the driving connection.

13. In combination, an internal combustion engine, a rotary motor armature, a driving connection therebetween, means including an electromagnet coil and an opposing spring adapted to shift said driving connection into and out of driving relation with the engine, means for connecting said electromagnet coil for energization independently of current flow in the armature and for connecting it in series with the armature to thereby effect coupling and uncoupling of the driving connection, and said electromagnet coil being utilized as a motor field coil of said armature.

In testimony whereof I have signed my name to this specification in the presence of two subscribing witneses.

SAMUEL W. RUSHMORE.

Witnesses:
MAUDE O. MERCIER,
R. T. KINGSFORD.